(12) United States Patent
Ikeda et al.

(10) Patent No.: US 6,424,517 B1
(45) Date of Patent: Jul. 23, 2002

(54) ELECTRIC DOUBLE LAYER CAPACITOR

(75) Inventors: Katsuji Ikeda; Kazuya Hiratsuka; Takeshi Kawasato, all of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/695,996

(22) Filed: Oct. 26, 2000

(30) Foreign Application Priority Data

Oct. 27, 1999 (JP) ............................................ 11-306046

(51) Int. Cl.⁷ .............. H01G 9/155; H01G 9/00

(52) U.S. Cl. .................. 361/502; 361/512; 361/503

(58) Field of Search .................. 361/502–504, 361/511–512, 523, 524, 530; 429/129

(56) References Cited

U.S. PATENT DOCUMENTS

| | | | |
|---|---|---|---|
| 5,922,492 A | * | 7/1999 | Takita et al. ............... 429/249 |
| 5,953,204 A | | 9/1999 | Suhara et al. |
| 6,104,600 A | | 8/2000 | Suhara et al. |
| 6,195,251 B1 | | 2/2001 | Suhara et al. |
| 6,236,560 B1 | | 5/2001 | Ikeda et al. |

FOREIGN PATENT DOCUMENTS

| | | | |
|---|---|---|---|
| EP | 0 113 298 | 7/1984 | |
| EP | 0 933 790 | 8/1999 | |
| EP | 0 933 790 A1 | * 8/1999 | .......... H01G/9/022 |

* cited by examiner

Primary Examiner—Dean A. Reichard
Assistant Examiner—Eric W. Thomas
(74) Attorney, Agent, or Firm—Oblon, Spivak, McClelland, Maier & Neustadt, P.C.

(57) ABSTRACT

The invention relates to a non-aqueous electric double layer capacitor which has a high power output, a high energy density, and has excellent voltage-retention properties.

17 Claims, No Drawings

ELECTRIC DOUBLE LAYER CAPACITOR

The present invention relates to a non-aqueous electric double layer capacitor which has a high power output and a high energy density; and which is excellent in the voltage-retention property.

Heretofore, as a separator to be disposed between positive and negative electrodes of an electric double layer capacitor, a polyethylene nonwoven fabric, a polypropylene nonwoven fabric, a polyester nonwoven fabric, kraft paper, a rayon/sisal mixed sheet, a manila hemp sheet, a polyester fiber sheet or a glass fiber sheet is, for example, known (e.g. JP-A-9-45586, JP-A-1-304719). The role of a separator is to electrically insulate the positive electrode from the negative electrode on one hand and to facilitate transfer of ions in the electrolyte, which takes place accompanying charge and discharge, on the other hand.

In recent years, an attention has been drawn to an electric double layer capacitor for high power applications. However, with a separator made of organic fibers of e.g. a polyethylene, the ion conductivity is low, and the internal resistance of the electric double layer capacitor is high, since the electrolyte absorbing-property and the electrolyte-holding property are low. Accordingly, if instantaneous large current discharge is carried out as one of main characteristics of an electric double layer capacitor, the voltage drop is substantial, such being not practical.

Further, a conventional separator made of paper is excellent in heat resistance and tensile strength and is sometimes effective for an electric double layer capacitor to be used for a power source wherein no large current discharge is carried out, like a hybrid power source used with a solar cell. However, when a conventional separator made of paper is used for an electric double layer capacitor for high power applications, wherein the electrolyte is non-aqueous, the ion permeability tends to be inadequate.

With an electric double layer capacitor for high power applications, it is desired to lower the resistance and to increase the capacitance per unit volume (hereinafter referred to as capacitance density), and it is accordingly required to make the separator as thin as possible. At the same time, thee separator is required to have a high porosity from the viewpoint of the electrolyte-absorbing property and the electrolyte-holding property. However, if a separator made of paper having a high porosity is made thin, the insulating property between the positive and negative electrodes tends to be inadequate, thus leading to micro-short circuiting, self-discharge or a decrease in the yield in the production of the capacitor.

Further, when an electrolyte is impregnated to an element formed by laminating a plurality of electrodes with separators interposed or winding two sheets of electrodes with a separator interposed, so that the electrodes and the separator are laminated in close contact to one another, for example, with a separator made of a paper having a thickness of not more than 100 $\mu$m. there is a limit in increasing the porosity, and it takes much time to inject the electrolyte, thus leading to a problem in the productivity.

Accordingly, it is an object of the present invention to provide an electric double layer capacitor having a low resistance and a high capacitance density with good productivity by employing a separator which is excellent in heat resistance, ion permeability, electrolyte-absorbing property and electrolyte-holding property and which has high strength even when it is thin, and is excellent in the electrical insulating property.

The present invention provides an electric double layer capacitor comprising a positive electrode and a negative electrode, each comprising a carbonaceous material as the main component, a separator interposed between the positive and negative electrodes, and a non-aqueous electrolyte, wherein said separator comprises a sheet having a thickness of from 10 to 80 $\mu$m and a porosity of from 50 to 85%, and a nonwoven fabric having a thickness of from 10 to 80 $\mu$m, a maximum pore diameter of from 10 to 60 $\mu$m and an air permeability of from 10 to 200 $cm^3/(cm^2 \cdot sec)$, laminated one on the other.

In the present invention, the thickness of the sheet is from 10 to 80 $\mu$m. If the thickness is less than 10 $\mu$m, the strength tends to be weak, and the handling tends to be difficult. If the thickness exceeds 80 $\mu$m, when it is laminated with a nonwoven fabric to form a separator, the proportion of the volume occupied by the separator in the electric double layer capacitor element tends to be high, whereby the capacitance density of the electric double layer capacitor can not be made sufficiently high. The thickness of the sheet is particularly preferably from 20 to 60 $\mu$m.

In the present invention, the porosity of the sheet is from 50 to 85%. If it is less than 50%, the electrolyte-absorbing property or the electrolyte-holding property tends to be inadequate, and the ion permeability tends to be inadequate. If it exceeds 85%, the strength of the sheet tends to be weak, whereby the handling tends to be difficult. It is particularly preferably from 60 to 80%. Further, in the present invention, the sheet preferably has substantially no opening. If the sheet has pinholes, micro-short circuiting is likely to take place, and accordingly, it should preferably have no such pinholes.

With a high porosity sheet with a porosity of at least 50% having adequate electrolyte-absorbing property and electrolyte-holding property, if the thickness is for example at most 100 $\mu$m, it tends to have pinholes although the capacitance density of the electric double layer capacitor can be made high. Accordingly, if one such high-porosity sheet is used as a separator for the electric double layer capacitor, short circuiting is likely to take place due to the pinholes, and self-discharge is likely to result.

On the other hand, in the present invention, the separator comprises a nonwoven fabric and a sheet having a porosity of from 50 to 85%, laminated one on the other, whereby the electrolyte can be held in both the above sheet and the nonwoven fabric, whereby electrolyte-holding can adequately be carried out even when a high density sheet is used, rather than the separator made solely of the above mentioned one high-porosity sheet. If the density is high, the probability of the presence of pinholes in the sheet will be low. Further, even if the above sheet having a porosity of from 50 to 85% has pinholes, by the presence of the nonwoven fabric, the distance between the electrodes facing each other with the separator interposed, can be maintained, whereby no substantial self-discharge will take place, and it is possible to increase the yield in the production of the electric double layer capacitor.

Further, with the nonwoven fabric of the present invention having a large maximum pore diameter and a high air permeability, the production efficiency is high in production of the electric double layer capacity having high capacitance. Namely, when an electrolyte is impregnated to an element formed by laminating electrodes in a close contact with a separator, such as a laminated structure wherein a plurality of, electrodes are laminated with separators interposed therebetween or a wound structure wherein two sheets of electrodes facing each other with a separator interposed therebetween are wound, the nonwoven fabric has a function to form paths for the electrolyte to permeate through the entire capacitor element, i.e. a function as a spacer, whereby the injection of the electrolyte can be carried out in a short period of time, and the productivity of the electric double layer capacitor can be increased.

Namely, in the case of a separator having the same thickness, a separator comprising the sheet of the present invention and the nonwoven fabric scarcely undergoes self-discharge and is excellent in the electrolyte-absorbing property and the electrolyte-holding property, as compared with the separator made solely of the above-mentioned one sheet, whereby the productivity of the electric double layer capacitor having high capacitance, can be increased.

The above sheet may be used alone as a single sheet, or a plurality of the above sheets may be laminated with a plurality of sheets of the nonwoven fabric to form a separator. When a plurality of the above sheets is used, the thickness of the separator tends to be thick, and such may be disadvantageous from the viewpoint of the capacitance density of the electric double layer capacitor, but the electrolyte-holding property can be increased, and adequate insulation can be attained even when the above sheet or nonwoven fabric is thin. The above sheet and the nonwoven fabric may be bonded by e.g. an adhesive.

In the present invention, the sheet constituting the separator is preferably made of fibers having a heat resistant temperature of at least 150° C., particularly preferably made of paper prepared from said fibers. Specifically, a nonwoven fabric or a porous film made of e.g. polypropylene, polyethylene or polytetrafluoroethylene, or polyester paper, cellulose paper or the like is preferred. Particularly preferred are polyester paper and regenerated cellulose paper, since they not only have a high heat resistant temperature but also can provide a sheet which has high strength even when it is thin and has a high porosity.

When cellulose paper is used, the density is preferably from 0.30 to 0.55 g/cm$^3$, whereby the electrolyte-absorbing property and the electrolyte-holding property will be excellent. The density is particularly preferably from 0.35 to 0.50 g/cm$^3$.

Further, when cellulose paper is used, any one of a sheet made of rayon fibers or a mixed paper of cellulose with glass fibers may be employed. Particularly preferred is a paper prepared to contain at least 50% by mass percentage of fibers obtained by beating regenerated cellulose fibers. Here, the regenerated cellulose fibers to be used as a starting material are regenerated cellulose fibers which can be beaten by a beating machine installed in a usual paper-making process, such as regenerated cellulose fibers having a high degree of polymerization or solvent-spun rayon.

Regenerated cellulose fibers which can be beaten, will be uniformly fibrillated and will have increased flexibility by the beating treatment. Accordingly, the paper prepared to contain at least 50% by mass percentage of fibers obtained by beating said fibers, is excellent in tensile strength. Further, the fibers fibrillated by beating, are extremely dense, and the cross sections of fibrils are substantially circular. Accordingly, if the paper prepared to contain at least 50% by mass percentage of the beaten fibers is used for a separator, the separator will be excellent in the ion permeability and will have a low resistance. The fibers obtained by beating regenerated cellulose fibers, are more preferably at least 65% by mass percentage, further preferably at least 80% by mass percentage, in the paper. The degree of beating is preferably such that beating is carried out until the Canadian Standard Freeness (hereafter referred as CSF value) stipulated in JIS P8121, will be from 0 to 600 ml.

Other material to be blended to the beaten regenerated cellulose fibers is not particularly limited, and fibers of e.g. manila hemp, sisal or craft pulp may be employed. These materials may be used without being beaten, but they are preferably beaten depending upon the degree of beating of the regenerated cellulose fibers.

In the present invention, the nonwoven fabric has a thickness of from 10 to 80 µm, a maximum pore diameter of from 10 to 60 µm and an air permeability of from 10 to 200 cm$^3$/(cm$^2$·sec). In order to increase the electrolyte-absorbing property of the separator without impairing the ion conductivity, the nonwoven fabric preferably has a large pore diameter and a high air permeability, and in order to obtain adequate insulation between the electrodes, the maximum pore diameter should preferably be small, and the air permeability should preferably be not too high. Accordingly, they are selected from the above ranges. The nonwoven fabric more preferably has a maximum pore diameter of from 10 to 40 µm, and an air permeability of from 10 to 150 cm$^3$/(cm$^2$·sec), particularly from 30 to 150 cm$^3$/(cm$^2$·sec).

Here, in the present specification, the maximum pore diameter is defined as the maximum diameter of through-pores as measured by projection of the nonwoven fabric, where the through-pores are space formed in fibers constituting the nonwoven fabric. Further, the air permeability is represented by the volume (cm$^3$) of the air passing through the nonwoven fabric per cm$^2$ per second, and indicates how easily the air passes through the nonwoven fabric.

If the thickness of the nonwoven fabric exceeds 80 µm, the capacitance density of the electric double layer capacitor tends to be small, and if it is less than 10 µm, the distance between the electrodes tends to be inadequate, whereby micro-short circuiting is likely to take place, or the strength of the nonwoven fabric tends to be weak, whereby the handling tends to be difficult during the production of the electric double layer capacitor. The thickness of the, nonwoven fabric is particularly preferably from 10 to 60 µm.

The fibers constituting the nonwoven fabric are not particularly limited so long as they have high tensile strength and high stability against the electrolyte. For an electric double layer capacitor employing a non-aqueous electrolyte, drying treatment at a high temperature is preferably carried out in order to sufficiently remove moisture in the capacitor element, and accordingly, the nonwoven fabric is preferably made of a material having high heat resistance. In order to carry out the removal of moisture by the above heat drying efficiently, a material having a heat resistant temperature of at least 150° C., particularly preferably at least 200° C., is preferred. As such heat resistant fibers, a polyethylene terephthalate, a polybutylene terephthalate, a polyimide, a fluorine-containing olefin polymer such as polytetrafluoroethylene, or polyphenylene sulfide may, for example, be mentioned.

Among them, particularly preferred is at least one member selected from the group consisting of polyethylene terephthalate, polybutylene terephthalate and polyphenylene sulfide. The heat deformation temperatures of the above materials are 210° C. with polybutylene terephthalate, 230° C. with polyethylene terephthalate and 260° C. with polyphenylene sulfides and every material has a heat resistance of at least 200° C.

When polyethylene terephthalate and polybutylene terephthalate are compared, polyethylene terephthalate is slightly superior in view of heat resistance. However, in the process of forming the nonwoven fabric, the forming temperature can be set low with polybutylene terephthalate having a lower heat deformation temperature, and the productivity tends to be high in view of e.g. temperature control., Further, with respect to the shrinkage factor during the formation, it is 1.2% with polyethylene terephthalate and 0.5% with polybutylene terephthalate, and polybutylene terephthalate is thereby superior in view of dimensional stability after the formation.

Polyphenylene sulfide has a high heat deformation temperature of 260° C., and is excellent in dimensional stability with a low forming shrinkage factor of 0.2%. However, the unit cost of the material is high, and accordingly, it is preferably used selectively for applications which particularly require durability to high temperature.

The nonwoven fabric prepared from polyphenylene sulfide, polyethylene terephthalate or polybutylene terephthalate is excellent in flexibility. Accordingly, it is suitably employed for either structure of the electric double layer capacitor of the present invention, i.e. a wound type wherein a positive electrode and a negative electrode facing each other are wound with a separator interposed therebetween to form an element, and a laminated type wherein a plurality of positive electrodes and negative electrodes are laminated with separators interposed to form an element.

Further, in the present invention, it is preferred to use, as the nonwoven fabric, one prepared by a melt blow method, followed by pressing. In the nonwoven fabric prepared by a melt blow method, intersection points of fibers are bonded by heat, whereby e.g. fraying is less likely to take place, differently from one prepared by a spun bonding method. Further, one immediately after prepared by a melt blow method is bulky and its thickness is not uniform, and it is likely to cause increase in non-uniformity in the thickness of a laminate of the electrodes and the separator when a capacitor is formed. Accordingly, it is preferred to use one having non-uniformity in the thickness decreased by pressing and having a uniform thickness. As the pressing, a method by a continuous roll pressing may, for example, be employed. Further, in the case of pressing, heating may be carried out at a temperature of not higher than the melting point of the material.

The fiber diameter of the fibers constituting the nonwoven fabric prepared by a melt blow method to be used here is preferably from 0.3 to 10 $\mu$m, particularly preferably from 0.5 to 7 $\mu$m. The nonwoven fabric is preferably thin from the viewpoint of the capacitance density of the electric double layer capacitor, and the above fiber diameter is preferably small in order to make the nonwoven fabric thin. However, the strength of the nonwoven fabric tends to be weak if the fiber diameter is too small.

Further, it is also preferred to use a cross-bonded nonwoven fabric comprising warp webs and weft webs made of fibers having a fiber diameter of from 0.3 to 20 $\mu$m, preferably from 1 to 15 $\mu$m, laminated and bonded. When the fiber diameter is within the above range, the cross-bonded nonwoven fabric is likely to be prepared stably. If the fiber diameter is less than 0.3 $\mu$m, clogging is likely to take place, and there is a fear that it takes long to impregnate the electrolyte to the element consisting of electrodes and a separator. If the fiber diameter exceeds 20 $\mu$m, the nonwoven fabric tends to be thick, whereby the capacitance density of the electric double layer capacitor tends to be low.

Here, the warp webs and the weft webs in the cross-bonded nonwoven fabric are preferably one obtained by stretching a continuum of long fiber filaments spun by a nonwoven fabric spinning machine which is used for preparing a nonwoven fabric by a melt blow method or a spun bonding method, and accumulated on e.g. a conveyer. In the cross-bonded nonwoven fabric, the warp webs and the weft webs are preferably laminated so that their respective stretch directions are perpendicular to each other. In the continuum of the long fiber filaments, the long fiber filaments are aligned preferably along the stretch direction, whereby the filaments after stretching tend to have a good alignment and a high strength. In such a case where stretch treatment is carried out, as the long fiber filaments, one, having a fiber diameter of a level of from 20 to 30 $\mu$m may be used so that the fiber diameter will be brought to be within a range of from 0.3 to 20 $\mu$m by stretch treatment.

The method of bonding the warp webs and the weft webs after the lamination is not particularly limited, and heat embossing, emulsion bonding, bonding by means of water jet, bonding by means of needle punching, ultrasonic sealing, powder dot bonding, a through-air method wherein a hot wind is passed, or stitch bonding may, for example, be employed.

The electric double layer capacitor of the present invention has a non-aqueous electrolyte. Accordingly, in order to reduce the leakage current and to secure the high withstanding voltage, it is necessary to remove moisture in the electric double layer capacitor element as far as possible. The moisture in the separator is preferably at most 1% by mass percentage. However, for example, in the case of cellulose paper, it usually contains from 3 to 10% by mass percentage of moisture.

In order to efficiently remove the moisture, it is preferred to preliminarily heat the separator at a temperature of at least 90° C. before it is disposed between the positive electrode and the negative electrode. Especially when in order to make an electric double layer capacitor having a large capacitance an element prepared by winding a pair of elongated electrodes with a separator interposed therebetween, is impregnated with an electrolyte and accommodated in a bottomed cylindrical container to have a cylindrical structure, or an element prepared by alternately laminating a plurality of positive and negative electrodes with a separator interposed therebetween, is impregnated with an electrolyte and accommodated in a rectangular container to have a rectangular structure, it tends to take time for the removal of the moisture after the formation of the element by the electrodes and the separator.

If the heating temperature is lower than 90° C., the removal of moisture from the separator tends to be inadequate, and the effect of e.g. reducing the leakage current tends to decrease. If it becomes too high, the sheet or the nonwoven fabric constituting the separator will undergo heat decomposition, and accordingly, the heating temperature is determined taking into their heat resistant temperatures into consideration. For example, if cellulose paper is used as the sheet, when the heating temperature exceeds 250° C., the thermal decomposition of the cellulose paper itself will start, whereby the strength tends to decrease or moisture will be generated. The heating time is suitably selected from the relation with the heating temperature, but it is usually at least 3 seconds.

As a method of heating, a method such as contacting with a heated heater, irradiation with infrared rays or heated air, may suitably be selected. For example, the sheet or the nonwoven fabric to be used in the present invention is usually available in a rolled state. However, in the rolled state, it is difficult to effectively remove moisture in a short period of time by heating. The sheet or the nonwoven fabric may be heated in a overlaid state, but heating is conducted preferably in a not closely overlaid state, whereby removal of moisture can be carried out effectively.

Specifically, for example, a rolled product of the sheet and a rolled product of the nonwoven fabric are heated in a dry atmosphere while they are unrolled, and the sheet and the nonwoven fabric are sequentially overlaid one on the other and rolled again to prepare a one separator rolled product, or the rolled product of the sheet and the rolled product of the nonwoven fabric are preliminarily cut into a plurality of sheets of the sheet and the nonwoven fabric, the heating and removal of moisture may be carried out so that the sheets and the nonwoven fabrics would not be closely overlaid one another, for example, by interposing a heat resistant spacer net between the sheets and between the nonwoven fabrics.

In the electric double layer capacitor of the present invention, the electrodes for both positive and negative electrodes, are carbonaceous electrodes comprising a carbon material as the main component, and the capacitor is based on a principle that electric charge is stored in an electric double layer formed at the interface between the electrodes and the electrolyte. To increase the capacitance of an electric double layer capacitor, the specific surface area of the carbon material is preferably large, and both positive and negative electrodes are preferably made of a carbon material having a specific surface area of from 100 to 2,500 m$^2$/g and an organic binder.

As the carbon material, activated carbon, carbon black, polyacene or carbon aerogel may, for example, be used. To the carbonaceous electrodes, an electrically conductive material may be incorporated to increase the electrical conductivity, as the case requires. An organic binder is added thereto, followed by forming into a sheet shape on a metal current collector so that it is integrated with the current collector to form an electrode assembly. The organic binder to be used here, may preferably be, for example, a polyvinylidene fluoride, a polytetrafluoroethylene, a polyimide resin or a polyamideimide resin. Further, the metal current collector may, for example, be a foil, a net or the like of e.g. aluminum or stainless steel. Particularly preferred is aluminum, since it is light in weight and has a low resistance.

The electrolyte to be used for an electric double layer capacitor includes an aqueous electrolyte and a non-aqueous electrolyte. However, the withstanding voltage is about 0.8 V with the aqueous electrolyte, while it is about 2.5 V with the non-aqueous electrolyte. The electrostatic energy of an electric double layer capacitor is proportional to the square of the withstanding voltage. Accordingly, from the viewpoint of the energy density, it is preferred to use the non-aqueous electrolyte, as the energy density can be made larger by about 9 times. The non-aqueous electrolyte is usually impregnated to an element comprising a positive electrode and a negative electrode made of carbonaceous electrodes and a separator interposed between said positive and negative electrodes, in a process for producing an electric double layer capacitor.

The solute for the non-aqueous electrolyte for the electric double layer capacitor of the present invention is preferably at least one salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion such as $BF_4^-$, $PF_6^-$, $CF_3SO_3^-$, $A_5F_6^-$, $N(SO_2CF_3)_2^-$ or $ClO_4^-$. Particularly preferred is an ammonium salt wherein at least one of $R^1$, $R^2$, $R^3$ and $R^4$ is different from the other.

Further, the organic solvent to be used for the non-aqueous electrolyte is preferably a cyclic carbonate such as ethylene carbonate, propylene carbonate or butylene carbonate, a nitrile such as acetonitrile, a linear carbonate such as dimethyl carbonate, ethyl methyl carbonate or diethyl carbonate, sulfolane or a sulfolane derivative. It is particularly preferably at least one member selected from the group consisting of propylene carbonate, ethylene carbonate, dimethyl carbonate, diethyl carbonate, methyl ethyl carbonate, acetonitrile, sulfolane and methylsulfolane.

Now, the present invention will be explained in further detail with reference to Examples. However, it should be understood that the present invention is by no means restricted to such specific Examples.

EXAMPLE 1

Solvent-spun rayon was beaten until the CSF value became 20 ml, and this rayon was used to prepare cellulose paper having a thickness of 25 µm and a density of 0.50 g/cm$^3$. The porosity was 55%, and the heat resistant temperature was 170° C.

A nonwoven fabric having a thickness of 50 µm, a maximum pore diameter of 35 µm and an air permeability of 60 cm$^3$/(cm$^2$·sec), prepared by using polybutylene terephthalate fibers having a fiber diameter of 3 µm by a melt blow method, followed by pressing, was laminated on the above cellulose paper, and this laminate was punched out in a rectangular shape having a width of 6.6 cm and a length of 13.6 cm, to obtain a separator.

A mixture comprising 80% by mass percentage of high purity activated carbon powder having a specific surface area of 1800 m$^2$/g, 10% by mass percentage of carbon black as an electrically conductive material and 10% by mass percentage of polytetrafluoroethylene as a binder, was kneaded while dropwise adding ethanol, and then rolled to prepare a sheet electrode having a thickness of 140 µm. This electrode was dried at 200° C. for 30 minutes to remove ethanol, and then it was bonded to each side of an aluminum foil current collector having a thickness of 40 µm and having a lead terminal at a portion having a width of 6 cm and a length of 13 cm, by means of an electrically conductive adhesive, and further subjected to roll pressing to prepare an electrode having a thickness of 330 µm and integrated with the current collector. Such an electrode was used for the positive electrode and the negative electrode.

18 Sheets of the above positive electrode and 18 sheets of the above negative electrode were alternately laminated via the above separator, to obtain a laminated element. This element was accommodated in a bottomed angular aluminum casing having a height of 15 cm, a width of 7 cm and a thickness of 2.2 cm. To the positive electrode terminals and the negative electrode terminals attached insulatedly and air-tightly to the aluminum cover having an electrolyte inlet hole, the respective electrode leads were ultrasonically welded, and then the cover was fit into the opening of the angular casing, and the peripheral portion was subjected to laser welding to seal the casing.

Then, vacuum drying treatment was carried out at 200° C. for 24 hours in such a state that the electrolyte inlet hole of the cover was open. Then, using a solution having 1.5 mol/l of triethylmonomethylammonium tetrafluoroborate dissolved in propylene carbonate, as an electrolyte, it was impregnated under vacuum to the above element from the above inlet hole, then a safety value was attached at the electrolyte inlet hole to air-tightly seal the hole, to obtain an electric double layer capacitor cell.

Using the above electric double layer capacitor cell, constant voltage charging was carried out at 2.5 V for 30 minutes, and then discharging was carried out at a constant current of 300 mA to a level of 1.0 V, whereby the capacitance was obtained from the slope of the discharge curve from 2.5 V to 1.0 V. Further, from the voltage drop at the initial stage of discharging, the internal resistance was calculated. Further, after constant voltage charging at 2.5 V for 12 hours, the cell was left to stand in an open circuit state, and the voltage retention after 72 hours was measured.

Further, the time until the electric double layer capacitor cell became constant at the above capacitance after completion of the vacuum impregnation of the electrolyte to the element, was measured, and this was taken as the electrolyte impregnation time. The results are shown in Table 1.

EXAMPLE 2

An electric double layer capacitor cell was prepared in the same manner as in Example 1 except that a nonwoven fabric having a thickness of 55 μm, a maximum pore diameter of 38 μm and an air permeability of 62 cm$^3$/(cm$^2$·sec), prepared by using polybutylene terephthalate fibers having a fiber diameter of 3 μm by a melt blow method, followed by pressing, was used. Using this cell, evaluation was carried out in the same manner as in Example 1. The results are shown in Table 1.

EXAMPLE 3

Webs prepared by using polyethylene terephthalate fibers by a melt blow method, were stretched along the direction in which the fibers were aligned, until the fiber diameters of the fibers constituting the webs became 10 μm, and the webs thus stretched were used as warp webs and weft webs. The warp webs and the weft webs were laminated so that their respective stretch directions were perpendicular to each other, and bonded by heat embossing, to obtain a cross-bonded nonwoven fabric having a thickness of 4 μm, a maximum pore diameter of 40μm and an air permeability of 98 cm$^3$/(cm$^2$·sec).

An electric double layer capacitor cell was prepared in the same manner as in Example 1 except that the above cross-bonded nonwoven fabric was used as the nonwoven fabric. Using this cell, evaluation was carried out in the same manner as in Example 1. The results are shown in Table 1.

EXAMPLE 4

(Comparative Example)

An electric double layer capacitor cell was prepared in the same manner as in Example 1 except that the separator was made of a single sheet of the cellulose paper used in Example 1 and the number of sheets of the electrodes was changed to 23 sheets for both the positive electrodes and the negative electrodes. Using this cell, evaluation was carried out in the same manner as in Example 1. The results are shown in Table 1.

EXAMPLE 5

(Comparative Example)

An electric double layer capacitor cell was prepared in the same manner as in Example 1 except that the separator was made of two sheets of the cellulose paper used in Example 1. Using this cell, evaluation was carried out in the same manner as in Example 1. The results are shown in Table 1.

TABLE 1

| | Capacitance (F) | Resistance (mΩ) | Electrolyte impregnation time | Voltage retention after 72 hrs. (V) |
|---|---|---|---|---|
| Ex. 1 | 1855 | 2.0 | 0.4 min. | 2.45 |
| Ex. 2 | 1850 | 2.1 | 0.4 min. | 2.46 |
| Ex. 3 | 1845 | 2.0 | 0.3 min. | 2.45 |
| Ex. 4 | 2390 | 1.8 | 8 hrs. | 0.14 |
| Ex. 5 | 1845 | 2.1 | 40 min. | 1.44 |

According to the present invention, it is possible to obtain an electric double layer capacitor which has a low internal resistance and is excellent in the voltage retention property with small self-discharge and which has a high capacitance density. Further, the electric double layer capacitor of the present invention is excellent in the electrolyte-absorbing property at the time of preparation, even if it has a structure wherein electrodes and separators are laminated and disposed at a high density, and accordingly the productivity is high.

The separator in the present invention is highly strong and has adequate strength for winding, whereby a wound type electric double layer capacitor can easily be prepared. The electric double layer capacitor of the present invention is particularly suitable for a wound type or laminated type electric double layer capacitor for a large current and large capacity, having a discharge capacitance of from 50 to 20,000 F or a discharge current of from 1 to 1,000 A.

What is claimed is:

1. An electric double layer capacitor comprising a positive electrode and a negative electrode, each comprising a carbonaceous material as the main component, a separator interposed between the positive and negative electrodes, and a non-aqueous electrolyte, wherein said separator comprises a sheet having a thickness of from 10 to 80 μm and a porosity of from 50 to 85%, and a nonwoven fabric having a thickness of from 10 to 80 μm, a maximum pore diameter of from 10 to 60 μm and an air permeability of from 10 to 200 cm$^3$/(cm$^2$·sec), laminated one on the other.

2. The electric double layer capacitor according to claim 1, wherein the nonwoven fabric is made of at least one type of fiber selected from the group consisting of polyphenylene sulfide, polyethylene terephthalate, and polybutylene terephthalate.

3. The electric double layer capacitor according to claim 2, wherein the nonwoven fabric is a cross-bonded nonwoven fabric comprising warp webs and weft webs made of fibers having a diameter of 0.3 to 20 μm, laminated and bonded.

4. The electric double layer capacitor according to claim 2, wherein the nonwoven fabric is a cross-bonded nonwoven fabric comprising warp webs and weft webs made of fibers having a diameter of 0.3 to 20 μm, laminated and bonded, and the sheet is made of paper prepared from fibers having a heat resistant temperature of at least 150° C.

5. The electric double layer capacitor according to claim 4, wherein the paper contains at least 50% by mass percentage of fibers obtained by beating regenerated cellulose fibers.

6. The electric double layer capacitor according to claim 1, wherein the sheet is made of paper prepared from fibers having a heat resistance temperature of at least 150° C.

7. The electric double layer capacitor according to claim 6, wherein the paper contains at least 50% by mass percentage of fibers obtained by beating regenerated cellulose fibers.

8. The electric double layer capacitor according to claim 1, wherein the carbonaceous material having a specific surface area of 100 to 2500 m$^2$/g and an organic binder, and the non-aqueous electrolyte comprises a solute which is a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion of $BF_4^-$, $PF_6^-$, $CF_3SO_3^-$, $AsF_6^-$, $N(SO_2CF_3)_2^-$ or $ClO_4^-$, and a solvent which is at least one member selected from the group consisting of propylene carbonate, ethylene carbonate, dimethyl carbonate, diethyl carbonate, methylethyl carbonate, acetonitrile, sulfolane and methylsulfolane.

9. The electric double layer capacitor according to claim 8, wherein the nonwoven fabric is a cross-bonded nonwoven fabric comprising warp webs and weft webs made of fibers having a diameter of 0.3 to 20 μm, laminated and bonded.

10. The electric double layer capacitor according to claim 9, wherein the sheet is made of paper prepared from fibers having a heat resistant temperature of at least 150° C.

11. The electric double layer capacitor according to claim 9, wherein the paper contains at least 50% by mass percentage of fibers obtained by beating regenerated cellulose fibers.

12. The electric double layer capacitor according to claim 8, wherein the organic binder is selected from the group consisting of a polyvinylidene fluoride, a polytetrafluoroethylene, a polyimide resin, and a polyamideimide resin.

13. The electric double layer capacitor according to claim 1, wherein the carbonaceous material comprises a carbon material selected from the group consisting of activated carbon, carbon black, polyacene, and carbon aerogel.

14. An electric double layer capacitor comprising an element formed by disposing a separator between a positive electrode and a negative electrode made of carbonaceous material, and a non-aqueous electrolyte impregnated to the element, wherein said separator comprises a sheet having a thickness of 10 to 80 μm and a porosity of 50 to 85%, and a spacer made of a nonwoven fabric having a thickness of 10 to 80 μm, a maximum pore diameter of 10 to 60 μm and an air permeability of 10 to 150 cm$^3$/(cm$^2$ sec), laminated one on the other.

15. The electric double layer capacitor according to claim 14, wherein the nonwoven fabric is made of at least one type of fiber selected from the group consisting of polyphenylene sulfide, polyethylene terephthalate, and polybutylene terephthalate.

16. The electric double layer capacitor according to claim 15, wherein the nonwoven fabric is prepared by using fibers having a diameter of 0.3 to 10 μm by a melt blow method, followed by pressing.

17. The electric double layer capacitor according to claim 14, wherein the carbonaceous material comprises a carbon material selected from the group consisting of activated carbon, carbon black, polyacene, and carbon aerogel.

* * * * *